June 26, 1956 — S. GERSHBERG — 2,751,784
APPARATUS FOR TESTING ADHESIVE TAPE
Filed June 20, 1952 — 5 Sheets-Sheet 1

Fig.1.

INVENTOR.
SOLOMON GERSHBERG
BY
ATTORNEYS

Fig.2.

June 26, 1956   S. GERSHBERG   2,751,784
APPARATUS FOR TESTING ADHESIVE TAPE
Filed June 20, 1952   5 Sheets-Sheet 3

INVENTOR.
SOLOMON GERSHBERG
BY
ATTORNEYS

June 26, 1956 S. GERSHBERG 2,751,784
APPARATUS FOR TESTING ADHESIVE TAPE
Filed June 20, 1952 5 Sheets-Sheet 4

INVENTOR.
SOLOMON GERSHBERG
BY
ATTORNEYS

June 26, 1956 S. GERSHBERG 2,751,784
APPARATUS FOR TESTING ADHESIVE TAPE
Filed June 20, 1952 5 Sheets-Sheet 5

INVENTOR.
SOLOMON GERSHBERG

United States Patent Office 2,751,784
Patented June 26, 1956

2,751,784

APPARATUS FOR TESTING ADHESIVE TAPE

Solomon Gershberg, New York, N. Y.

Application June 20, 1952, Serial No. 294,762

4 Claims. (Cl. 73—150)

(Granted under Title 35, U. S. Code (1952), sec. 266)

The invention described herein may be manufactured and used by or for the Government for governmental purposes, without payment to me of any royalty thereon.

The present invention provides improved apparatus for testing the adhesiveness of adhesively coated materials such as adhesive tapes and other various adhesive items used in first aid and major or minor surgical treatments.

The apparatus heretofore employed are devised to apply a shearing force to the specimens which is applied exactly in the plane of the tape in order to produce consistent results. However, in actual use, the adhesiveness of a plaster is determined not by the shear force, which is impossible because of the characteristics of the skin and irregular surface of the body, but by the amount of tackiness and the binding force of the plaster. Many other factors contribute to discrepancies and disadvantages in the customarily employed testing procedures.

In accordance with the present invention, there is provided an improved testing apparatus for determining the adhesiveness of adhesive tape, which will produce reproducible and accurate results enabling ready and accurate determinations of relative adhesive qualities of samples of tapes manufactured by various producers; and the improved apparatus provided by the present development enables the quantitative determination of any change in adhesiveness of a given sample due to aging, storage and other deteriorating factors. In employing the present improved equipment and operating technique, all operations are performed mechanically, hence they are not subject to variations inherent in an operator.

Further objects and advantages of the present invention will become apparent as the description proceeds and the features of novelty will be pointed out in particularity in the appended claims.

The invention will be understood more readily from reference to the accompanying drawings, in which.

Before proceeding to a description of the illustrated equipment, it may be noted that the drawings illustrate two modifications of apparatus for measuring the amount of adhesiveness of adhesive surgical tape or similar adhesive materials, the determinations or measuring of the amount of adhesiveness being determined by two general apparatuses, namely, (1) a "plunger apparatus" and (2) a "strip apparatus."

The equipment used is illustrated in the accompanying drawings, Figs. 1 through 9 inclusive, showing equipment for determining adhesiveness with the "plunger apparatus," while the modified embodiment of the equipment illustrated in Figs. 10 through 18 is suitable for making the determinations with the "strip apparatus."

Referring first to the illustrative embodiment of the apparatus shown in Figs. 1 through 9, it will be seen that the testing equipment illustrated therein comprises essentially at horizontally disposed table A on which is mounted the testing equipment and accessories therefor.

The testing equipment comprises a testing table B, a vertically upstanding guide frame C, a reciprocable scale frame D, with operating accessories E, comprising a motor and associated parts which will be described in detail hereinafter, and a rheostat F for controlling a heater mounted in the testing table.

The testing table B comprises a box 20 which houses an electric heater 22 and is provided with a cover 24, which may be composed of brass, aluminum alloy or any other suitable material upon which the test specimen 26 of adhesive may be supported. This test specimen 26 may be unwrapped from a standard spool or roll 28 of adhesive tape that is mounted on a supporting mandrel 30 rotatably held in upstanding brackets 32 secured to parallel bar rails 34 upon which also is mounted the box 20.

The top cover 24 of the box 20 is substantially planar and smooth so as to offer minimum resistance to movement of the adhesive strip 26, the uncoated side of which engages this smooth planar top 24. Adjustably mounted above this top 24 and suitably spaced therefrom is a guide panel 36 having an aperture 38 extending therethrough and centrally disposed relatively to this panel. This panel 36 rests on coil springs 40 that are retained on parallel vertical screws 42 that are held in the panel 36. These screws 42 receive sleeves 44 that bear against the upper surface of the panel 36 and are fitted over the screws 42. Lock nuts 46 are threaded onto the screws 42 and bear against the sleeves 44, so that the height of the panel 36 above the top cover 24 of the box 22 may be adjusted against pressure of the springs 40.

Secured to the underside of the panel 36 by means of screws 37 or equivalent fastening means is a clamping block 48 which is provided with a hole 50 extending vertically therethrough, which registers with and is co-extensive with the hole 38 in the panel 36. The clamping block 48 is made suitably from brass or any suitable material which is substantially next to the adhesive of the test strip 26, which is unwrapped progressively from the spool 28 and wound on a spool or reel 52, which is mounted on upstanding bearing brackets 54 which are spaced from the box 20 oppositely to the spool 28, and substantially the same distance from the box 20 as are the brackets 32 on which the test spool 28 is mounted.

In testing the strip 26, the test strip or tape is pulled between the clamping block 48 and the planar top 24 of the box 20, so that the test tape will be heated uniformly by the heater 22 and the test applied at equally spaced intervals therealong, and an electric timer G is provided and mounted in full view of the operator.

The registering apertures 38 and 50 receive a plunger 56 of known dimensions, it being understood that these apertures 38 and 50 provide access of this plunger 56 to the adhesively coated side of the tape 26 being tested. It may be that the tape 26 is sufficiently wide to cover completely the aperture 50, but this is not a necessary condition for the test. It is important, however, as will become apparent as the description proceeds, that all observations be made under known and constant conditions. The sample or test spool 52 is mounted on a shaft 58, mounted in bearings 60 on the brackets 54 and rotated by a manual crank lever 62, the brackets 54 being interconnected by a unitary web 64 to form a rigid structure. The brackets 32 are braced by a transversely extending bar 66, as will be apparent from the drawings.

The plunger 56 is provided with an enlarged shoulder 68 that receives a threaded end 70 of a vertically disposed suspension rod or stem 72 which carries a heavy weight 74 of known fixed value. This suspension rod 72 has its upper end received in a tubular connecting suspension link 76 which has a slot 78 therein, the suspension rod 72 being retained by a retaining screw 80 that is received in the slot 78 and is retained by the closed ends of the slot and the sides thereof, which are engaged by the head of the screw 80. A graduating line 82 is marked on the suspension link 76 for a purpose hereinafter to be described. The top end of the suspension link 76 is provided with an eye opening 84 for reception of a hook 86, provided with a long shank 88, the top end of which is secured to a pair of connecting links 90, 90a, there being anchored to these respective links similar chains or cables 92, 92a which pass in opposite directions around similar sheaves 94, 94a and are anchored to these sheaves by screws or equivalent anchoring means 96, 96a, these sheaves 94, 94a being turnably mounted on shafts 98, 98a that are retained in a bottom cross beam structure 100, 100a of the reciprocating scale beam D.

These sheaves 94, 94a receive threaded rods 102, 102a which depend from the sheaves and are secured in place by nuts 104. The sheaves 94, 94a are of equal diameter, the rods 102, 102a are of equal length and diameter, and these rods receive on their lower ends the similar pendulum weights 106, 106a that are of equal known values, and which are held on the rods 102, 102a by lock nuts 108 and 110. Under the action of the large weight 74, the value of which exceeds the combined weights of the pendulum weights 106, 106a, these latter are moved either towards or away from each other as will be referred to hereinafter, the sheaves 94 and 94a being turnable in opposite directions, as indicated by the arrows thereon shown in Fig. 9, the actuating chains 92, 92a being passed in opposite directions around these sheaves, and the screws 96, 96a anchoring these chains (or cables) at diametrically opposite locations or points on these sheaves. The purpose and action of these pendulum weights 106, 106a will become apparent hereinafter.

The scale frame D is vertically reciprocable in the upstanding guide frame C, the corresponding vertical side beams or standards 112 of which are provided on their inner surfaces with similar parallel guide tracks 114 between which are mounted and operate anti-friction rollers 116 on which the scale frame D is mounted, there being one of such rollers at each corner of the scale frame D that turn on similar axles 118 held in the frame D by lock nuts 120.

This scale frame D comprises spaced parallel, horizontal transverse bars 100, 100a that are spaced apart the length of the aforesaid axles 118, there being upstanding from these transverse bars 100, 100a vertical lateral members 122, 122a that preferably are fabricated integrally with the horizontal bars 100, 100a, and which are formed as flat strips, the tops of which are interconnected by arcuate top frame strips 124, 124a, these arcuate top frame members 124, 124a being rigidly braced and spaced apart at the center thereof by a spacer bolt 126 to which is anchored the bottom end of a flexible suspension chain or cable 128, the connections for, and actuation of, being referred to hereinafter. An arcuate scale 130 graduated in pounds and fractions thereof, and which is concentric with the arcuate top frame strip 124, is secured to the latter by screws 132. If desired, the weight units graduated on scale 130 may be in metric units instead of avoirdupois.

Extending through the similar and spaced transverse frame bars 100, 100a, and at the mid-point thereof, is mounted a shaft 134, which projects forwardly of the front transverse frame bar 100 for receiving a scale pointer 140, which rides over the graduations of the scale 130. The scale pointer 140 is threadedly received on the end of the shaft 134 and is held in place by cooperating lock nuts 141, 141a. The pinion 136 on this shaft 134 meshes with a gear 142 which is rotatable with shaft 98 and forwardly adjacent to the pulley sheave 94, it being clear that application of a downwardly directed force to the suspension hook 88 of a value greater than that of the weights 106, 106a, will rotate the pinion 136 through gear 142 as pulley sheaves 94, 94a turn in the direction of the arrows applied thereto, as shown on Fig. 9 of the drawings, which shows that an adequate pull on the flexible chains 92, 92a as transmitted through the suspension hook 88, will rotate the sheave 94 in a counterclockwise direction and sheave 94a in a clockwise direction, thereby moving the pendulum weights 106, 106a away from each other. The rotation of sheave 94 rotates shaft 98 and gear 142 mounted on the shaft 98, this rotation being transmitted to pinion 136 on shaft 134, turning the latter to move the scale pointer 140 over scale 130 from the large zero ("0") indicium on this scale to whatever is the value of the weight on suspension hook 88, which displacement of the scale pointer 140 is a measurement of the amount of force required to separate the plunger 56 from the adhesive coating on the strip 26 being tested. A second, or stop, pointer 144 is mounted on a screw or bolt 146 which is independent of the mounting of the scale pointer 140, this mounting means 146 extending through a bar 138 that is carried by the transverse frame beams 100, 100a and spaced in advance of the front scale beam 100 by spacer bolts 143 secured in place by nuts 145 on the rear end of the spacer bolts 143 which project through the rear transverse frame bar 100a.

The stop pointer 144 has an abutment lug 150 which projects rearwardly of the pointer 144 near the end of the pointer adjacent to the scale 130, this lug 150 being engaged by the scale pointer 140 and is carried thereby to whatever reading on the scale 130 is reached by the scale pointer 140, the stop pointer being thus moved by the said scale pointer to the corresponding position of the scale pointer on the scale 130, the stop pointer remaining at this position to give the scale reading when the scale pointer 140 returns to the large zero mark responsively to release of the pull being exerted on the suspension hook 88. The lower portion of the stop pointer 144 is thickened to form a counterweight 144a for the stop pointer, so that the pointer is maintained in stable equilibrium, so that the stop pointer 144 will remain in the position to which it is carried by the scale pointer 140. A spring 152 is provided for further controlling the movement of the stop pointer 144. The large zero mark on the scale 130 to which the scale pointer returns responsively to release of downward pull on the hook 88, which release marks the separation of the strip 26 from plunger 56, corresponds in its location of the actual weight of the suspension link 76, hanger rod 72, weight 74, and plunger 56 together with its enlarged shoulder 68, so that the scale readings above this large zero mark represent the force in pounds (or other weight units) exerted by the adhesion between the end surface of the plunger 56 and the adhesive coating on the strip 26, between the moment of application of the plunger to the test strip 26 and the moment of separation of the plunger from the strip. Since the pull of the plunger 56 and weight 74 with the parts associated therewith is appreciable even without the load imparted thereon by the adhesiveness of the strip 26 on the plunger 56 during the actual testing of the strip, the pendulum weights 106, 106a remain separated in an amount corresponding to such weight, even when the scale pointer 140 has returned to the large zero graduation on the scale. The significance of this will become clear hereinafter. After each test, the stop pointer 144 is returned manually to some location on the scale 130 where it will be picked up by the advancing movement of the scale pointer during the succeeding test.

It has been noted that the scale frame D is suspended at its central point from a flexible cable 128, the suspension enabling free vertically reciprocable movement of the frame in the guide tracks 114. This cable 128 passes over and in contact with pulley sheaves 152 and 154 operating in bearing blocks 156, 158, respectively, on the top transverse horizontal beam 160 of the frame C, the chain cable 128 having one end attached to the spacer bolt 126 centrally disposed relative to the arcuate bars 124, 124a of the scale frame D as has been mentioned above. The cable 128 leads to a vertically reciprocable link 162 mounted eccentrically on a rotating disc 164 operated by a gear reducer 166 driven by a worm 167 operating from the shaft of the motor E. The rotation of the disc 164 produces a simple harmonic vertical reciprocation to the link 162, alternately tensioning and releasing the cable 128, thereby vertically reciprocating the frame D.

The operation of the above-described apparatus is as follows as applied to the determination of adhesiveness by the so-called "plunger method."

The test spool 23 which carries the adhesive strip 26 being tested, is placed on the wooden mandrel 30 and mounted in the supply brackets 32. About four inches of the specimen tape 26 are unwound as evenly as possible, with the adhesive surface up. The free end of the specimen is grasped with the fingers, pulled, and passed beneath the clamping block 48, which is raised out of contact with the cover 24 of the testing table B by loosening thumb screws 46, these screws then being tightened to hold the tape 26 in engagement with the cover 24 above the heater 22, which is operated so as to heat the test tape to a temperature of 37°–39° C. (body temperature) as indicated by a thermometer 168 engaging the said cover 24. The free end of the specimen is attached to the take-up reel 52 and a known length of the strip, for example 12 inches, is wound on the take-up reel 52 by turning the crank 62. The specimen then is clamped, the motor E is started and the plunger 56 is lowered with the scale frame D until it is just within the hole 50 in the clamp 48. The motor E is stopped for about 4 to 5 seconds, as indicated by the timer G in order to stabilize the plunger, the motor E then being started and the plunger lowered until it touches the adhesive surface of the specimen. The motor conveniently is 1/20 H. P. gear reduction, and the eccentric link 162 is mounted one inch off-center from the rotating disc 164, this disc 164 rotating at 2.2 R. P. M. The plunger 56 is mounted in weight 74 of known value, the stem 72 of which is slidably mounted in slot 78 of the suspension link 76. With the motor E running, the plunger is lowered until it touches the adhesive surface of the specimen 26 and until the cross pin 80 of the rod 72 is just opposite the graduation line 82 on the suspension link 76, thus assuring a constant pressure of the plunger on the adhesive surface of the specimen 26. After 30 seconds as indicated by the timer G, the motor E is started and the upward movement of the plunger responsively to the raising of the scale frame D will cause the separation of the plunger from the adhesive coating on the specimen 26; and the force required for this separation will be indicated on the scale 130 as the pointer 140 is moved over the scale responsively to the lifting of the scale frame D as the eccentric link rotates and pulls upwardly on the suspension chain 128. As the pointer 140 moves upwardly along the scale it picks up the stop pointer 144 and carries the latter along with it to the end of the travel of the pointer 140, which represents the force of the separation of the plunger from the adhesive side of the test strip 26. The scale reading of the stop pointer 144 is recorded, it being understood that the scale pointer 140 returns to zero position on the scale (large zero) responsively to the separation of the plunger from the strip. Any adhering adhesive is removed from the bottom of the plunger by cleaning the bottom of the plunger with a piece of gauze moistened with benzol. A further known length of the specimen, for instance, about an inch, is unwound, clamped, the plunger lowered, and the above operation is repeated and the scale reading noted after each test, the stop pointer 144 being returned manually after each reading to a scale indication below the expected reading. These readings are repeated a desired number of times, for instance, ten determinations, the average scale reading for such ten determinations being multiplied by 5.1 to get the value of the adhesiveness in lbs./sq. inch. This value of 5.1 is obtained as follows:

The diameter of the plunging Bakelite end is 0.5 inch, and as the end is substantially circular, the area of contact of the end of the plunger with the adhesive coating on the specimen 26 being expressed by $\pi r^2$ will be $3.14 \times 0.25^2 = 3.14 \times 0.0625 = 0.196$ sq. inch. The weight of the plunger is 1 lb. Therefore, 1 divided by 0.196=5.1 lbs./sq. inch, and 5.1 multiplied by the scale reading=lbs./sq. inch as the value of the adhesiveness, the scale reading being a dimensionless multiplier.

It will be understood from the foregoing description that when the weight is applied to the plunger by its engagement with the specimen, and the scale frame D is raised to effect the separation, the scale pointer 140 turns in a clockwise direction and engages the projection 150 on the stop pointer 144, moving the latter to the reading on the scale corresponding to the force of the separation of the specimen 26 from the plunger. As the pointer 140 moves clockwise, the equal weights 106, 106a separate, and when the plunger is released from the specimen, the value of the weights 106, 106a being greater than that of the weight 74 and plunger 56, the weights 106, 106a return together to starting position, thereby returning the scale pointer 140 to zero position (large zero) on the scale. The stop pointer 144 then is returned manually to a position below the expected reading for the next determination.

Figure 1:
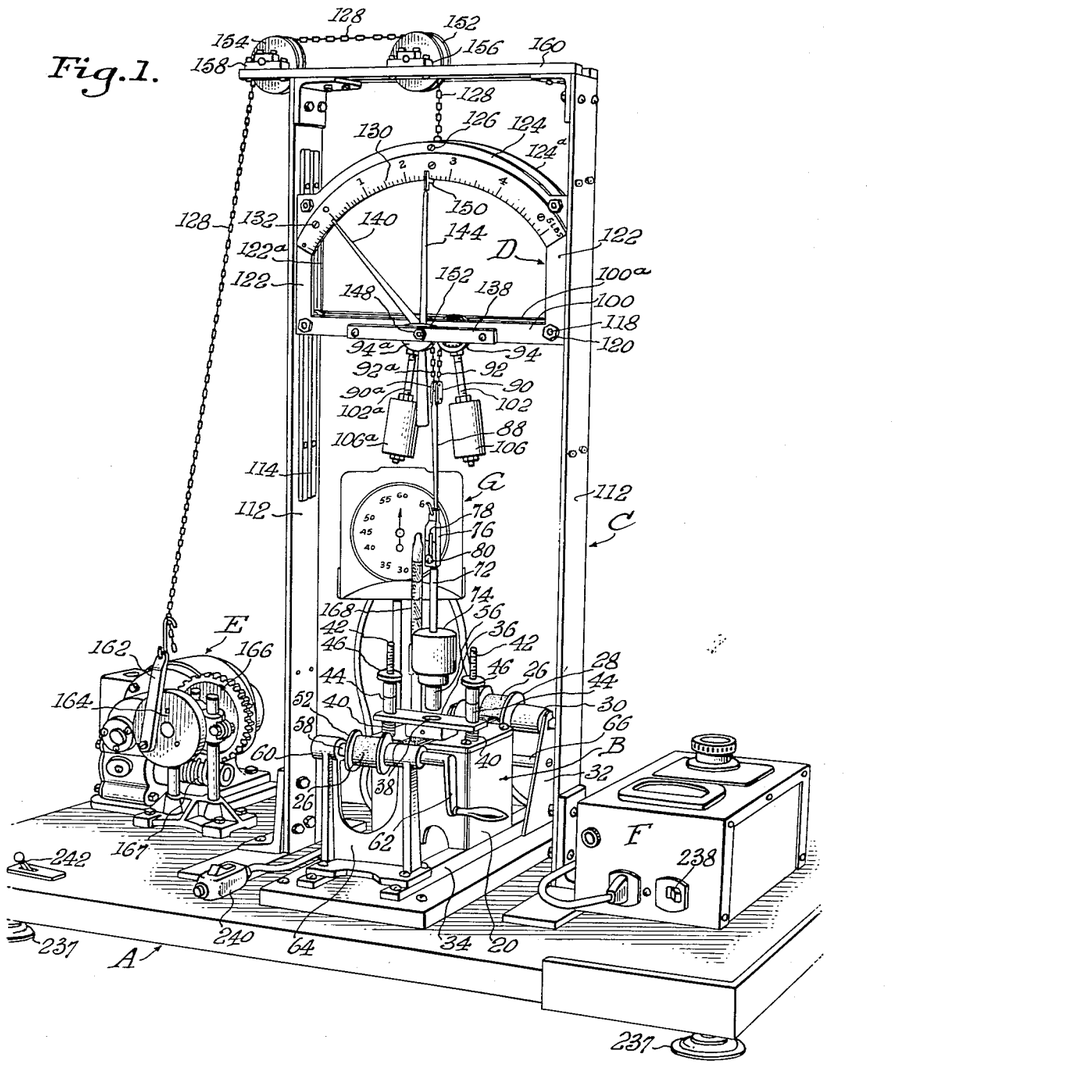
Fig. 1 is a perspective view of one form of apparatus embracing the principles of the invention, the view showing an embodiment of the testing apparatus in positions for carrying out the determinations in accordance with one illustrative procedure.
Figure 2:
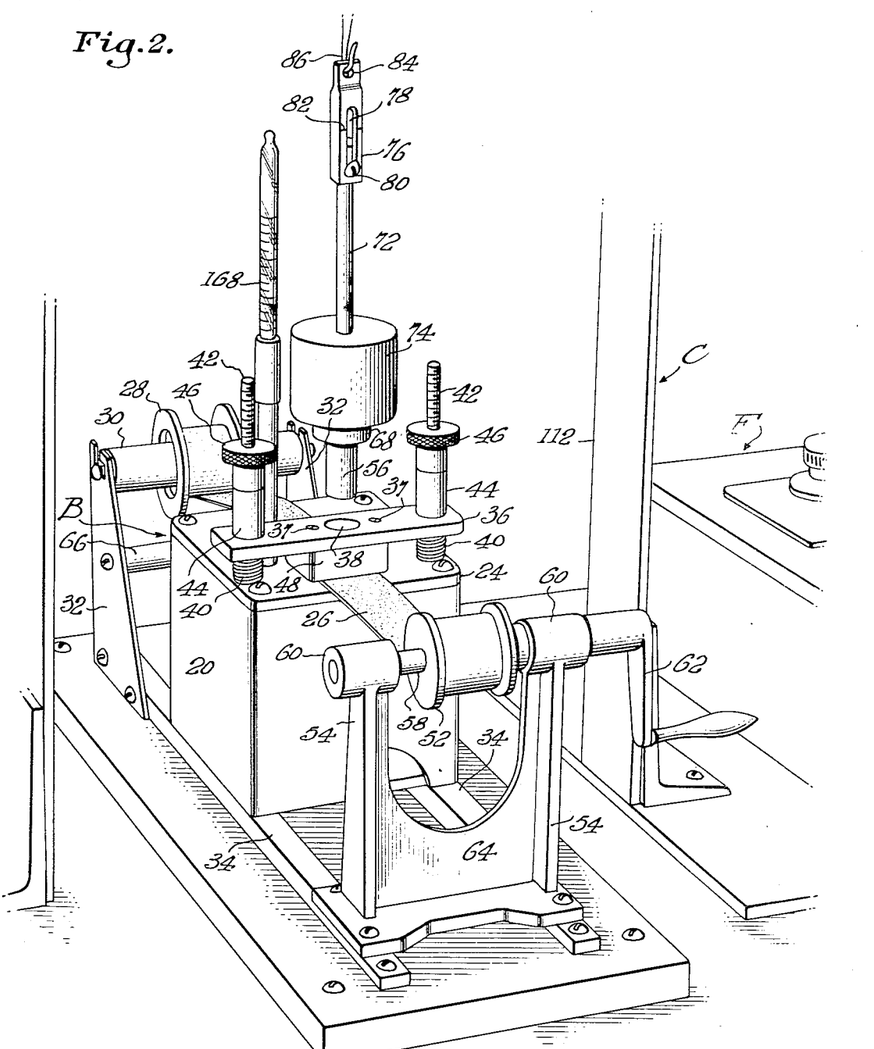
Fig. 2 is an enlarged perspective view of a testing table and associated parts of the equipment as shown in Fig. 1.
Figures 3, 4:
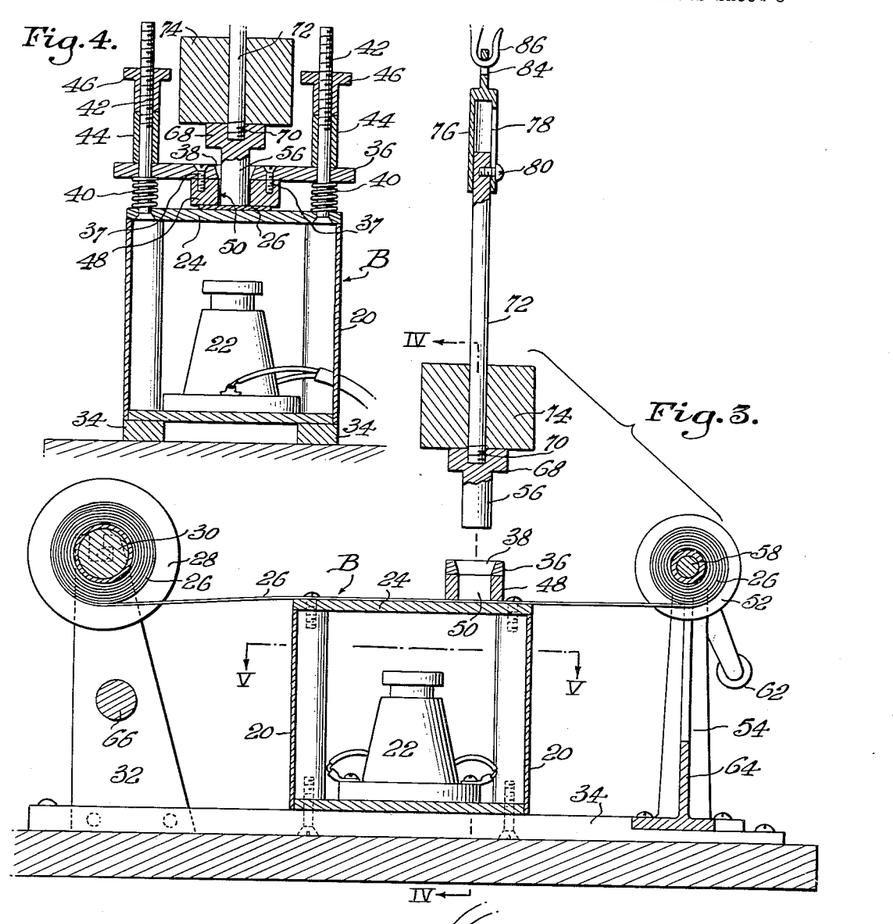
Fig. 3 is a vertical fragmentary sectional elevation of the parts of the equipment shown in Fig. 2, looking from the left of Fig. 2.
Fig. 4 is a sectional view taken on the line IV—IV of Fig. 3, looking in the direction of the arrows and showing parts of the equipment in testing position.
Figure 5:
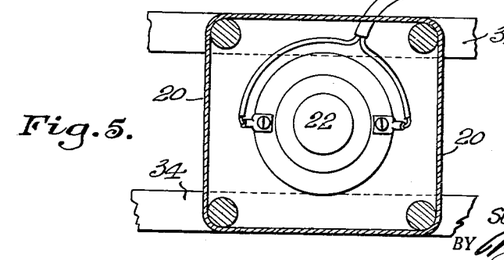
Fig. 5 is a horizontal sectional view taken on the line V—V of Fig. 3, looking in the direction of the arrows.
Figures 6, 7, 8, 9:
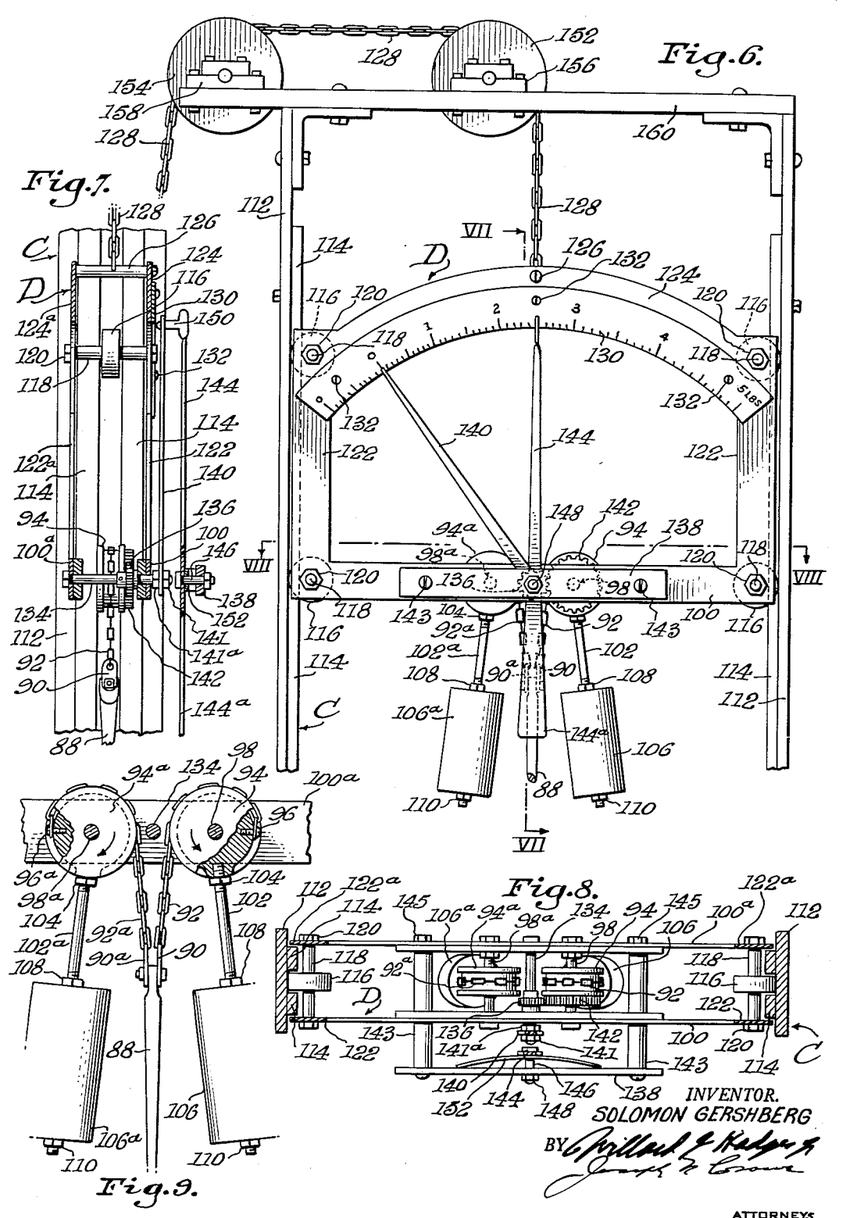
Fig. 6 is an enlarged fragmentary front elevation of the apparatus showing details of the operating means for the indicating scale and pointers associated therewith.
Fig. 7 is a detailed vertical sectional view taken on the line VII—VII of Fig. 6, looking in the direction of the arrows.
Fig. 8 is a horizontal sectional view taken on the line VIII—VIII of Fig. 6, looking in the direction of the arrows.
Fig. 9 is an enlarged fragmentary side view, partly in section, of pointer-actuating, weight-controlled sheaves, shown, for example, in Figs. 1 and 6.
Figures 10, 11, 12, 13, 14, 15, 18:
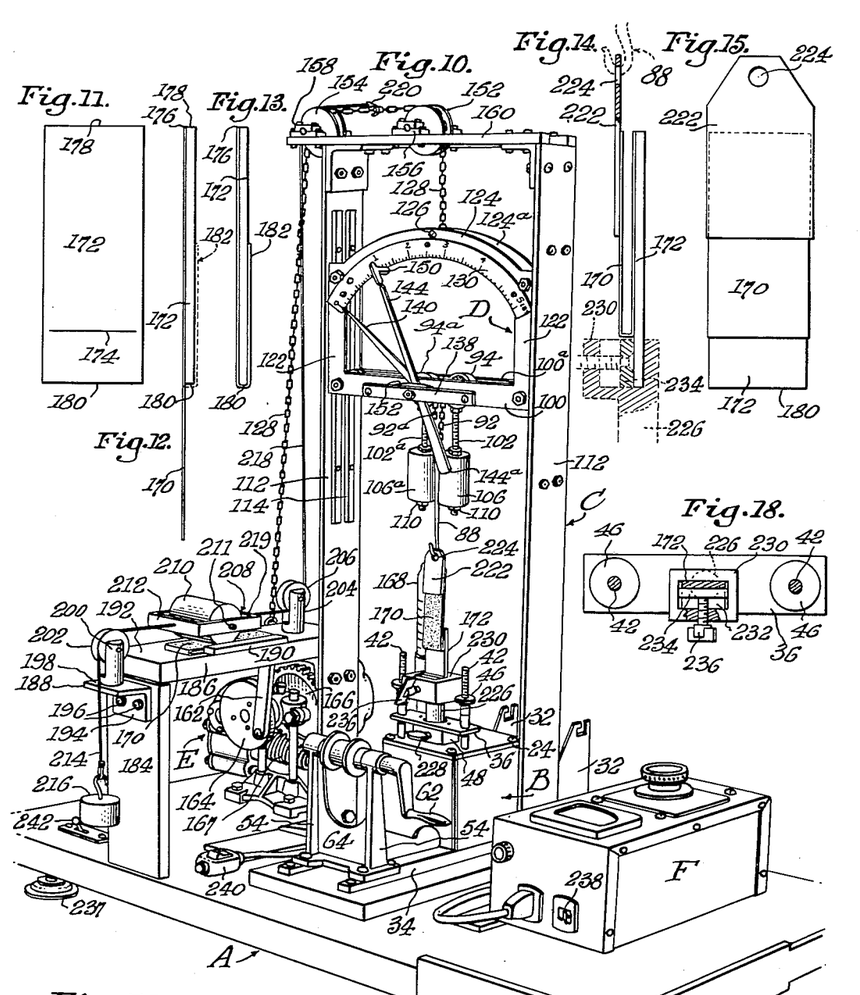
Fig. 10 is a perspective view of a modified embodiment of equipment from that shown in Fig. 1, the view showing the equipment in operation.
Fig. 11 is a front elevation of a specimen-mounting panel for a test specimen to be tested on the equipment of Fig. 10.
Figs. 12 and 13 are successive side elevations showing the manner of applying a test specimen to the specimen-mounting panel of Fig. 11.
Fig. 14 is a side elevation of the specimen-mounting assembly employed in Fig. 10 showing details of the assembly and specimen in testing position.
Fig. 15 is a front elevation of the parts shown in Fig. 14.
Fig. 18 is a horizontal sectional view on the line XVIII—XVIII of Fig. 16 looking in the direction of the arrows.

The above described "plunger method" may be supplemented by a so-called "strip method" which now will be described and wherein adhesiveness is measured by the force required to strip a test specimen of adhesive tape from a "Bakelite" panel of known dimensions, to which panel the test specimen has been applied under known standard conditions. The apparatus employed for the determinations by the "strip method" is the same as that described above, except for the following modifications:

For the "strip method" the previously described plunger 56, weight 74, and suspension link 76 are removed from the hook 86. This removal allows the pendulum weights 106, 106a to collapse together until they come into substantial engagement and the scale pointer 140 comes to rest at the "small zero" reading at the extreme left of the scale 130 as is shown in Fig. 10 of the drawings. Figs. 10 through 18 of the drawings illustrate this "strip method" which is operated as follows:

A test specimen 170 of known dimensions, such as conveniently 4 inches long and one inch wide, is applied lengthwise to a "Bakelite" panel 172 having a scribe line 174 thereon on one side towards what will be the upper end of the panel 172 when in operation. The panel 172 is of known dimensions, somewhat smaller than the dimensions of the test specimen. For example, using a test specimen 4 inches long by 1 inch in width, the panel 172 may be 2½ inches long, $^{59}/_{64}$ inch wide, and $^{1}/_{16}$ inch thick. The test specimen is applied lengthwise of the panel, with the adhesive surface of the specimen engaging a flat surface of the panel and with one end 176 of the specimen coincident with what will be the top edge 178 of the panel when the test is being run. The free end of the specimen is folded around the opposite end 180 of the Bakelite panel and applied to the other side of the panel as is indicated at 182 on Fig. 13.

Mounted on the table A and adjacent to the frame C is a roller table assembly, comprising a mounting leg 184, a flat horizontal table top 186, an end angle bracket 188, and lateral guide strip 190, on top surface 192 of the table top 186. The angle bracket 188 has a vertical arm 194 secured to the leg 184 of the roller table by screws, bolts or equivalent fastening means 196, a horizontal arm of the bracket indicated at 198 mounting a vertical bearing block 200 which rotatably carries a pulley sheave 202. The opposite end of the roller table is secured suitably to vertical member 112 of frame C, and on this opposite end of the roller table is a second bearing block 204 in which a second pulley sheave 206 is rotatably mounted. A frame or yoke 208 retains a roller 210, this being mounted for free rotation in the frame 208 on axle 211, and freely rolling on the top surface 192 of the roller table. One end 212 of the roller frame 208 has a flexible cable 214 secured thereto, this cable 214 passing over the pulley sheave 202 in engagement therewith, and freely suspending a weight 216 therefrom. This weight 216 is heavier than the combined weight of the roller 210, which is of known value, and the frame 208, so that the weight 216 continuously pulls the roller 210 towards the left, as viewed in Fig. 10.

A second flexible cable 218 is attached to the opposite end 219 of the roller frame 208, and is passed around sheave 206 beneath this sheave and then extends upwardly around sheave 154 on the top horizontal transverse bar 160 of the frame C. The cable 218 is secured to the actuating cable 128 for the scale frame D at a point intermediate the sheaves 154 and 152, on which sheaves the scale frame D is suspended by the flexible cable 128. The attachment of cable 218 to the cable 128 is indicated at 220.

As has been mentioned previously herein, the flexible cable 128 is secured to the offset link arm 162 mounted on the rotating disc 164 driven from the gear reducer 166 operated by motor E as aforesaid, the scale frame D being vertically reciprocably responsive to the simple harmonic vertical reciprocatory movement of the arm 162, so that as the scale frame D moves downwardly between guides 114, the connection 220 between 128 and 218 is moved towards the right as viewed in Fig. 10, so that the roller 210 and its mounting frame 208 are pulled towards the right against the pull of the suspended weight 216; and as the scale frame D moves upwardly responsively to downward pull exerted on the cable 128 by the link arm 162, cable 218 tends to slacken as connection 220 moves towards the left, so that the weight 216 pulls roller 210 and its frame 208 towards the left. This action therefore reciprocates the rolling motion of roller 210 on the top surface 192 of the table, so that the roller 210 rolls back and forth against the lateral guide 190.

The roller 210 has, in practice, a known weight, for example 1.78 pounds, although this is not particularly critical, and it is pulled at a known lineal speed, for example, 12 inches per minute. Having prepared and mounted a desired number of specimens to be tested (for example, ten specimens) by cutting strips of equal length and having dimensions equal to those illustratively mentioned above, and mounting these specimens on their respective panels 172 as described above, with the motor E running at its regular speed, the roller 210 weighing, for example, 1.78 pounds as aforesaid, is passed twice over each test specimen successively, at a constant known speed, for example, 12 inches per minute, as has been noted above. The temperature of each of the specimens is adjusted to 37°–39° C. for 20 minutes.

It may be noted that the scribe line 174 of each panel 172 is at the same distance (½ inch) from the end 180 of each panel. After the temperature of each specimen has been adjusted as stated above, the folded portion 182 of the specimen is peeled off from the rear flat surface of its panel and is pressed firmly onto a 1 by 1-inch area of an aluminum tab 222, the peeling of the specimen being continued until the scribe line 174 is just exposed, thus exposing a ½-inch length of the panel 172 from the end 180 thereof. The aluminum tab 222 has a hole 224 in its upper end adapted to receive the suspension hook 88, which is suspended as aforesaid from flexible cables 92, 92a passing around and secured to the pulley sheaves 94, 94a mounted between the bottom transverse beams 100 of the scale frame D.

The half-inch length of the Bakelite panel 172, which has been exposed as has been described above, is inserted and clamped in a clamp, which now will be described, is received and held firmly in the registering openings 38 and 50 of the guide panel 36 and clamping block 48 on the testing table B. The above-mentioned clamp is shown in Figs. 16, 17 and 18 of the drawings and comprises a cylindrical shank 226 that extends into the aforesaid openings 38 and 50 and is secured by a locking thumb screw 228 that operates in the clamping block 48, the inner end of this locking screw engaging the shank 226 of the clamp.

Figure 16:
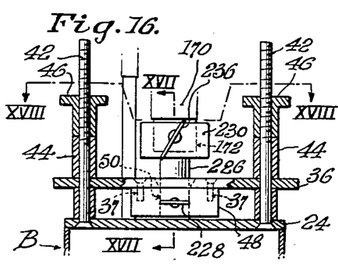
Fig. 16 is a vertical sectional view of the strip testing table of the equipment of Fig. 10 showing a manner of clamping of the specimen-mounting panel in testing position.
Figure 17:
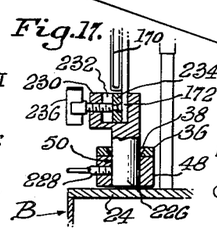
Fig. 17 is a vertical sectional view of the clamp taken on the line XVII—XVII of Fig. 16, looking in the direction of the arrows.

The shank 226 of the clamp enlarges into a clamping head 230 having a clamping recess 232 therein which receives the exposed portion of the specimen-carrying panel 172, and which has a movable clamping element 234 therein that is mounted on a clamping screw 236 which extends into the recess 232 and which is actuated manually by an operator for clamping the exposed end of the panel 172 between the clamping element 234 and the rear surface of the recess 232, as will be obvious from Figs. 16 and 17. When the test specimen thus is clamped vertically, the hole 224 of the tab 222 is attached to the hook 88.

The panel 172 with the specimen now is in vertical position. The motor is started and the specimen is peeled off the panel by the upward movement of the scale 130. The highest reading of the stop pointer 144 on the scale is noted and the adhesiveness of the specimen is the average weight in pounds of the number of specimens (for example, ten) tested. The small zero ("o") on the scale 130 is the starting point for the scale pointer 140, as has been mentioned above.

From the foregoing description, results obtained in the plunger method are expressed in terms of pounds per square inch representing a force necessary to break the contact between the plunger and the adhesive surface of the tape. Results obtained in the strip method are expressed in terms of pounds (the highest scale reading) representing a force necessary to strip the specimen from the panel having a standard width, say 59/64 inch, the length of the stripped portion of the specimen being about 1 inch. The results are reproducible and the tests are not affected by the size of the specimen or the tensile strength of the tape cloth. All operations are performed mechanically, and therefore are not subject to variations inherent in the operator. Thus, all specimens are subjected to known constant conditions, although specific weights, dimensions, times, and other specific values noted in connection with this description are to be understood as being illustrative only, and are specifically indicated as mentioning conditions which have been found in practice to be conveniently realized and applied. In the methods described above, the plunger is stated to be "Bakelite," as is also the panels 172. Other materials obviously may be substituted for "Bakelite," but the latter specific material is found to be very satisfactory in practice. The dimensions of the panels employed as mountings for the adhesive specimens are not specifically critical, but it is an important consideration that all factors be constant in their values from test to test for assuring accurately comparable results. Aluminum tab 222 is employed in the shear method to hold the end of the specimen because of simplicity, effectiveness and ease of operation. Other suitable materials such as "Bakelite" may be used instead of aluminum.

The stripping (peeling off) force is applied to the specimen on the panel in its perpendicular position. Under this condition, the portion of the specimen on the tab 222 is held by a shear force while the portion on the panel 172 is being stripped (peeled off). This shear force is considerably greater than the stripping force, hence there is no possibility of the specimen being stripped off the tab.

The dimensions of the panel 172 are not critical, but need to be constant for all panels. The value 59/64 inch stated above for the width of the panels merely indicates that for a specimen one inch wide, the panel may be 59/64 inch, that is, somewhat narrower than the width of the specimen, although specifically this may be variable from this value, although as stated, all panels (ten, where there are ten specimens to be tested) are to be the same. Thus, for one inch wide specimens, the panels may be 15/16 inch wide, while for specimens less than one inch wide, panels about 1/32 inch narrower than the corresponding width of the specimen may be used. The purpose for applying the free end of the specimen to the opposite side of the panel is to facilitate the proper handling of the specimen in the rolling and temperature adjustment procedures.

It will be noted from Fig. 10 that the table A upon which the equipment is mounted, may be provided with leveling screws 237, or equivalent leveling means by which the table A may be leveled and maintained level (horizontal) in both longitudinal and transverse directions; and the electrical equipment accessory to the apparatus, such as the motor E, heater 22, timer G, are supplied by way of a rheostat (or transformer) F, which receives current from a suitable source or supply of current, not shown. Suitable control switches as needed are provided, as indicated at 238 and 240, for example, there being also provided a master control switch such as is indicated at 242. The housing 20 for the heater 22 encloses the heater on all sides to protect it from extraneous cooling air currents for assuring an even heating effect being obtained therefrom so that the test specimens may be maintained in accordance with both procedures herein described at substantially normal body temperature, namely, within a range of from 37° to 39° C., as this is the temperature to which the tapes will be subjected when in use.

From the foregoing description, it will be evident that in both procedures, the tape is employed for testing with its adhesively coated side in contact with a "Bakelite" or equivalent thermoplastic surface, the scale 130 indicating in both instances the force required for the separation. In the "plunger method" the Bakelite surface contacted with the adhesive layer of the tape is the bottom end surface of the plunger 56, while in the "strip method" the surfaces corresponding thereto are the surfaces of the test panels 172, which are separate panels, one for each test specimen employed. In both methods of procedure, individual test specimens of the tape are employed, the test specimens in the "plunger method" being the separate areas of the strip 26, to which the plunger 56 is applied, these areas being equally spaced along the tape, since the tape is unrolled from its roll 28 and rolled onto reel 52 at constant lineal speed through operation of the manual crank 62, the plunger 56 being applied to the tape at equal time intervals as designated by the timer G. This operation is repeated for a selected number of times of application of the plunger to the strip, the length of the strip between each application being always the same. In the "strip method," individual specimens of equal length are cut from the strip of adhesive pulled from the conventional spool or roll on which the adhesive tape is conventionally dispensed, these lengths being known and constant as determined by the dimension of the squal test panels 172. If ten test specimens be selected for test by the plunger method, the plunger 56 will be applied at ten intervals to the strip 26, and the distances between each of the applications of the plunger will be controlled so as to be equal to the length of the equal test specimens 170. The specimens are applied to the "Bakelite" surfaces in both methods under constant conditions for affording comparable adhesiveness, the force of attachment of the specimens in the plunger method being the sum of the known and constant weight of the plunger 56, plunger head 68, weight 74, with the remaining elements associated therewith, the total weight being the sum of these weights which is moved through the same constant distance for each application of the plunger 56 to the strip 26, this distance being the length of movement of the screw 80 on weight stem 72 from its position coincident with the bottom of the slot 78 of connecting link 76 to the position of the screw 80 coincident with the graduated line 82 on the link responsively to impressment of the plunger 56 onto the successive equally spaced points of application of the plunger 56 to the strip 26; in the "strip method" the specimens are applied equally to their panels because of the weight of the roller 210 applied for a constant period of time to the specimens 170, and for the same number of passes of each test specimen beneath the roller. Also, since the pendulum weights 106, 106a are of equal weight, the suspension chains 92, 92a being of equal length, the pulley sheaves 94 and 94a being of equal diameters, and the chains 92, 92a being secured to these pulley sheaves at correspondingly equal points, there are assured equal deflections of the scale pointer 140 along the scale 100 when there are actually obtained equal adhesion between the test specimens and the "Bakelite" surfaces contacted therewith.

It will be understood that the term "test specimens" as applied and referred to in the appended claims is intended to be generic to the separate and successive and equally spaced areas of contact between the test strip 26 of the plunger method and the "Bakelite" surface of the plunger 56 and to the series of individually cut, equal specimens of the "strip method" unless the term "test specimens" is specifically differentiatingly modified and distinguished. The use of the term "Bakelite," Bakelite surface or backing element as employed in this specification, is intended to apply generally to the plunger 56 and the bottom surface thereof and also to the individual test panels 172, the term "Bakelite" as employed herein being applicable generally to synthetic resinous materials which are inert to the commonly employed adhesive compositions, and being intended to include as functional equivalents, thermosetting or thermoplastic aldehyde condensation resins, which class of resins is found to be inert to, or incompatible with the adhesive coating on the strip. It is thought that the equivalence of materials will be clearly apparent.

In operating the "plunger method" the following precautions should be observed:

1. Keep the test strip clean and protect it during the tests from contamination from dust, oil, water, finger marks, and any other extraneous effects imparing the stickening of the adhesive coating on the strip.

2. Unwind the strip for each test as uniformly as possible, avoiding jerks.

3. Control the heater so as to maintain the test strip at normal body temperature (that is, within the range 37–39° C.).

4. Make all determinations at regular time intervals.

5. Observe the end of the plunger after each determination for any evidence of tearing the adhesive mass from the specimen.

6. Keep the end of the plunger clean and dry.

From the foregoing description and consideration of the improvements presented by the present invention and the illustrative embodiments thereof described in the foregoing description and shown in the accompanying drawings, it will be apparent that various structural details may be changed and modified without departing from the inventive concept; and accordingly it will be understood that it is intended and desired to embrace within the scope of the invention such modifications and changes as may be necessary or desirable to adapt the invention to varying conditions and uses, as defined by the appended claims.

Having thus described my invention, what I claim as new and wish to secure by Letters Patent is:

1. Apparatus for testing adhesiveness of adhesive tape carrying on a side thereof an adhesive coating, which comprises, in combination, an inert surface for contacting tape to be tested, reciprocating means for adhesively applying the tape to the said inert surface under a known constant pressure until uniform adhesion between the tape and inert surface is obtained, mechanism for effecting separation between the inert surface and the tape including a frame mounted for receiprocating movement in a direction parallel to the direction of separation of said tape and said inert surface, a dynamometer carried by said reciprocating frame, suspension means depending from said dynamometer and coacting with said reciprocating means for separating said tape from said inert surface, reciprocating mechanism for the frame for exerting a varying pulling force on said suspension means in a direction parallel to the direction of separation of said tape and said inert surface, said dynamometer including means for indicating the amount of force required to effect separation of the inert surface from the tape.

2. Apparatus for testing adhesiveness of adhesive tape carrying an adhesive coating on a side thereof, which comprises, in combination, inert means for securing tape to be tested, reciprocating means for adhesively applying the tape to the said securing means under a known constant pressure until uniform adhesion between the tape and securing means is obtained, oppositely spaced substantially vertical frame members, a scale frame mounted in the frame member for vertical reciprocatory movement relative thereto, motor-actuated means for reciprocably moving the scale frame, suspension means for the scale frame connected to the said motor-actuated means, a pair of pulley sheaves mounted on the frame, flexible cable means passing over and around the pulley sheaves in opposite directions and secured to the sheaves at diametrically opposite locations for turning the pulley sheaves in opposite directions, suspension means for securing the tape-receiving means and suspending the tape securing means from the flexible cable means on the pulley sheaves, substantially equal counterweights depending from the pulley sheaves, the said counterweights substantially equalling the weight of the tape securing means and the suspension means therefor, but less than the pull on the suspension means during separation of the tape from the tape-securing means, the said counterweights having a pendulum-type action on the pulley sheaves, the said counterweights separating under the weight or pull of the tape-securing means and the suspension means during separation of the tape from the tape-securing means responsively to upward movement of the scale frame, a scale on the frame indicating amount of pull required to separate tape from the tape-securing means, a scale pointer cooperating with the scale for indicating amount of pull on the tape required to separate the tape from the tape-securing means, mechanism interconnecting the pointer with one of the pulley sheaves for actuating the pointer along the scale responsively to pull on the pulley sheaves in excess of the pendulum action of the said counterweights on the said sheaves as the tape is pulled from the tape-securing means, a stop pointer carried by the scale frame having a portion engageable by the scale pointer to the limit of movement thereof for fixedly indicating the said limit of movement for indicating the scale reading of the scale pointer, manually operable means for resetting the stop pointer for the next successive reading, the scale pointer returning to its starting point on the scale responsively to movement of the counterweights towards each other with corresponding opposite return movement of the pulley sheaves on completion of separation of the tape from the tape-securing means and accompanying release of pull on the said flexible cables and suspension means.

3. Apparatus for testing adhesiveness of adhesive tape carrying an adhesive coating on a side thereof, which comprises, in combination, a testing table, holding means for the tape, means for feeding tape at selected intervals through the holding means and beneath an aperture provided in the holding means for reception of a tape-testing plunger, oppositely spaced, substantially vertical frame members carried by the testing table, a scale frame vertically slidable in the frame members, motor-actuated means for vertically reciprocating the scale frame, suspension means for the scale frame, motor-actuated means connected to the said suspension means for vertically reciprocating the scale frame, a pair of pulley sheaves mounted on the frame, flexible cable means passing over and around the pulley sheaves in opposite directions and secured to the sheaves at diametrically opposite locations for turning the pulley sheaves in opposite direction, hanger means suspended from the said flexible cable and including complemental parallel coupling links provided with spacer pins extending between the links, a suspension hook having a shank pivotally mounted on a lower spacer pin, a tubular connecting yoke suspended from the suspension hook, a weight vertically slidably mounted in the connecting yoke, the said weight being of known value, a plunger carried by the weight for engaging the tape being tested and adapted to apply a fixed pressure to the strip during a series of successive determinations, the weight values of the counterweights on the said pulley sheaves equalling the value of the weight of the plunger and of the weight carrying the plunger, the suspension yoke, the connecting links and the flexible cable passing over the sheaves, the said plunger entering the aperture in the testing table during downward stroke of the scale frame, and pulling way from the tape during upward stroke of the scale frame, the counterweights on the pulley sheaves moving towards each other as the scale frame moves downwardly and away from each other during upward movement of the scale frame and attendant separation of the plunger from the tape, a scale on the scale frame, a scale pointer operating in conjunction with the scale for indicating the amount of pull required for separating the plunger from the tape, and actuating means for the scale pointer carried by one of the pulley sheaves and by the pointer for actuating the pointer from a starting position on the scale to final position indicating total pull of the tape on the plunger until separation thereof, and for returning the pointer to its starting position responsively to separation of the plunger from the tape.

4. Apparatus for testing adhesiveness of adhesive tape carrying an adhesive coating on a side thereof, which comprises, in combination, a testing table for receiving tape to be tested, holding means for the tape on the table, heating means for heating the tape to a selected known temperature as it is passed along the table, means for feeding the tape at selected constant time intervals through the holding means and beneath an apertured provided in the holding means for reception of a tape-testing plunger, oppositely spaced substantially vertically extending frame members carried by the testing table, a scale frame vertically shiftable in the frame member, suspension means for the scale frame including a flexible suspension cable secured to the scale frame, and pulley sheaves mounted on an overhead beam connecting the said vertically extending frame members, motor-actuated means connected to the suspension cable for imparting vertical reciprocatory movement to the scale frame through a fixed distance, a pair of pulley sheaves mounted on lower portions of the scale frame in adjacent juxtaposition, flexible cables passing in opposite directions over and around these pulley sheaves and secured adjacent to one end of the said sheaves at diametrically opposite locations for oppositely rotating the pulley sheaves, pendulum-type counterweights depending from the pulley sheaves, hanger means suspended from the last mentioned flexible cables and including a pair of parallel coupling links provided with spacer pins between the links, the said last mentioned flexible cables having free ends secured to the said links, a suspension hook having a shank portion pivotally secured to a lower pin between the said links, a tubular connecting yoke suspended from the suspension hook, a weight of known value mounted in the connecting yoke and slidable relative thereto, a graduation on the yoke extending transversely thereof, means retaining the said hook in the yoke and defining indicating means coinciding with the graduation on the yoke when the weight is applied to the tape for indicating constant pressure on the tape, the said weight including a depending plunger of known dimensions having a free end of known area adapted to enter the aperture in the tape-holding means for engaging the free end of the plunger with the tape under the said fixed pressure exerted by the weight for adhering the plunger to the tape, the combined values of the pendulum-type counterweights equaling the combined weight values of the said plunger, the weight carrying the plunger, the suspension yoke, the hook, and the said parallel links, whereby the said counterweights and oppositely-directed cables turn the pulley sheaves towards each other during downward movements of the scale frame for applying the plunger to the tape, and away from each other during upward movement of the scale frame for pulling the plunger away from the tape adhering thereto, a scale mounted on the scale frame for indicating amount of pull required to separate the plunger from the tape, a scale pointer mounted on the scale frame for pivotal movement relative thereto along and adjacent to the scale from a starting position to an end position of the movement corresponding to the total pull exerted by the tape on the plunger, an actuating pinion carried by the pointer, a gear carried by a pulley sheave meshing with the pinion for turning the pinion and scale pointer to advance the pointer over the scale from a starting zero position to a terminal position indicating total pull of the tape on the plunger, a stop pointer pivotally mounted on the scale frame independently of the scale pointer, an abutment on the stop pointer engageable by the scale pointer as the latter advances responsively to the pull on the plunger exerted by the tape, the scale pointer thereby carrying the stop pointer to the end of advancing movement of the scale pointer for indicating total pull exerted by the tape, the stop pointer remaining in the said position as the scale pointer is returned to its starting position responsively to separation of the plunger from the tape, and means for manually resetting the stop pointer for reengagement with the scale pointer during a succeeding determination on the tape.

References Cited in the file of this patent
UNITED STATES PATENTS

| | | |
|---|---|---|
| 1,679,751 | Stevenson | Aug. 7, 1926 |
| 1,920,039 | Thwing | July 25, 1933 |
| 1,991,854 | Johanson | Feb. 19, 1935 |
| 2,051,464 | Bradner et al. | Aug. 18, 1936 |
| 2,070,862 | Healy | Feb. 16, 1937 |
| 2,345,968 | Green | Apr. 4, 1944 |
| 2,406,989 | Bonner et al. | Sept. 3, 1946 |
| 2,473,517 | Freedman | June 21, 1949 |
| 2,604,783 | Herrlinger | July 29, 1952 |